Sept. 9, 1958 K. D. SCHREYER ET AL 2,851,165

MERCHANDISE STORAGE MEANS

Filed Oct. 1, 1956 5 Sheets-Sheet 1

INVENTORS
Kenneth D. Schreyer,
BY Humphrey F. Parker,
& Erford E. Robins,
Beau, Brooks, Buckley & Beau.
ATTORNEYS.

MERCHANDISE STORAGE MEANS

Filed Oct. 1, 1956 5 Sheets-Sheet 2

INVENTORS
Kenneth D. Schreyer,
BY Humphrey F. Parker,
& Erford E. Robins.
Bean, Brooks, Buckley + Bean
ATTORNEYS.

MERCHANDISE STORAGE MEANS

Filed Oct. 1, 1956 5 Sheets-Sheet 3

INVENTORS
Kenneth D. Schreyer,
BY Humphrey F. Parker.
& Erford E. Robins,

Bean, Brooks, Buckley & Bean ATTORNEYS.

INVENTORS
Kenneth D. Schreyer,
Humphrey F. Parker,
& Erford E. Robins
BY
Bean, Brooks, Buckley + Bean
ATTORNEYS.

Sept. 9, 1958 K. D. SCHREYER ET AL 2,851,165

MERCHANDISE STORAGE MEANS

Filed Oct. 1, 1956 5 Sheets-Sheet 5

INVENTORS
Kenneth D. Schreyer,
Humphrey F. Parker,
& Erford E. Robins,
BY Bean, Brooks, Buckley & Bean.
ATTORNEYS.

United States Patent Office 2,851,165

Patented Sept. 9, 1958

2,851,165

MERCHANDISE STORAGE MEANS

Kenneth D. Schreyer, Snyder, Humphrey F. Parker, Buffalo, and Erford E. Robins, North Tonawanda, N. Y., assignors to Columbus McKinnon Chain Corporation, Tonawanda, N. Y.

Application October 1, 1956, Serial No. 613,114

12 Claims. (Cl. 211—1.5)

This invention relates generally to the merchandise handling art, and more specifically to a new and useful merchandise display and storage rack system having means for selectively interchanging the position of multiple display racks.

A display and storage system constructed in accord with this invention is particularly adapted for garment storage and display purposes, and the instant disclosure accordingly is directed to such use of the invention although it is or readily can be adapted to handle other types of merchandise as will become clearly apparent.

Single garment racks can handle only a limited number of garments such that a large number of racks occupying a substantial amount of floor space are required to properly display all of the garments being offered for sale. Such floor space is at a premium, and in addition extra personnel are needed to handle the various racks, all of which necessarily reduces profits and/or increases the cost of the merchandise to the consumer.

Accordingly, a primary object of this invention is to provide a practical merchandise storage and display system utilizing superposed storage and display racks, with means for selectively bringing either rack to a readily accessible position, whereby the storage and display capacity of a given area is substantially doubled.

Another object of this invention is to provide a garment storage and display device having vertically related racks wherein the relative position of the racks can be selectively reversed quickly, easily and safely and without unduly interfering with the available aisle space.

Still another object of this invention is to provide the foregoing in a system which is relatively simple and inexpensive in construction and which is durable and dependable in operation.

A merchandise storage and display system constructed in accordance with this invention is characterized by the provision of vertically related garment racks, one rack being mounted for substantially vertical reciprocation and another rack being mounted to swerve laterally and vertically about the path of the first rack, with means for so moving said racks to selectively interchange the relative positions thereof.

The foregoing and other objects, advantages and characterizing features of a merchandise storage and display system constructed in accord with this invention will become clearly apparent from the ensuing detail description of two presently preferred embodiments thereof, taken together with the accompanying drawings wherein like reference numerals denote like parts throughout the various views and wherein.

Figure 1:
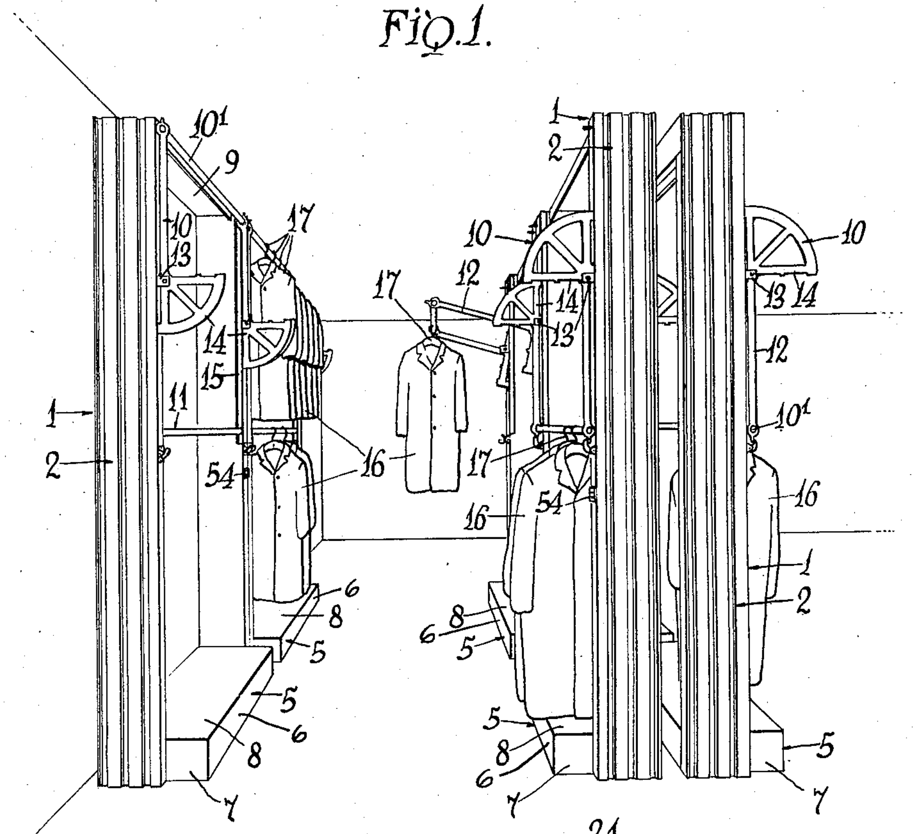
Fig. 1 is a perspective view showing an installation comprising a number of garment storage and display racks constructed in accord with this invention.
Figure 9:
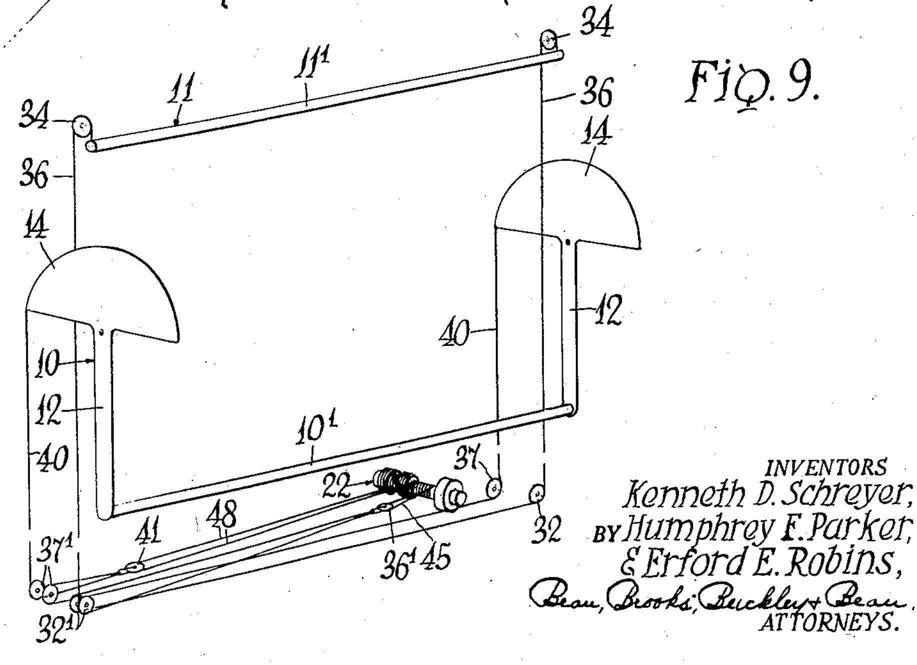
Fig. 9 is a schematic view illustrating the operation thereof.

Referring now specifically to that embodiment of the invention which is illustrated in Figs. 1 through 9 of the accompanying drawing, a garment rack unit of this invention is generally designated 1 and comprises a generally upright frame having opposite side walls 2 each comprising a pair of opposed, generally channel sectioned members 2' and 2'' secured together to provide a tubular, box-like construction. For greater strength, members 2' and 2'' preferably are formed to provide strengthening ribs 3 therein, and are centrally reinforced by cross straps or ties 4.

Side walls 2 are secured to and extend upwardly from a base 5 having front and rear walls 6, opposite side walls 7 and a top plate 8 defining a chamber for an actuating mechanism to be described hereafter. A top plate 9 extends between and is fastened to side walls 2 adjacent the upper ends thereof.

This frame structure supports two vertically stacked garment storage and display racks comprising a top rack 10 and a bottom rack 11. Rack 10 comprises a substantially horizontal bar 10' carried at the outer ends of a pair of arms 12 which are pivoted onto brackets 13 carried by side walls 2 for swinging movement about a substantially horizontal axis and which support generally semi-circular cam devices 14 at their inner ends for movement therewith as will be described. The lower rack 11 comprises a substantially horizontal bar 11' having its opposite ends engaged in vertically extending, channel shaped guide tracks 15 formed in side wall members 2'' for reciprocating movement therealong in a generally vertical direction, the inner part of pivot brackets 13 being extended and formed to fit around track portion 15.

Each rack 10, 11 is designed to carry a number of garments, indicated at 16, suspended from the respective rack bars 10', 11' as by hangers 17 of conventional form, whereby each unit stores and displays garments on two levels, and means are provided whereby the position of top and bottom racks 10 and 11 can be interchanged at will as will now be described.

Figure 8:
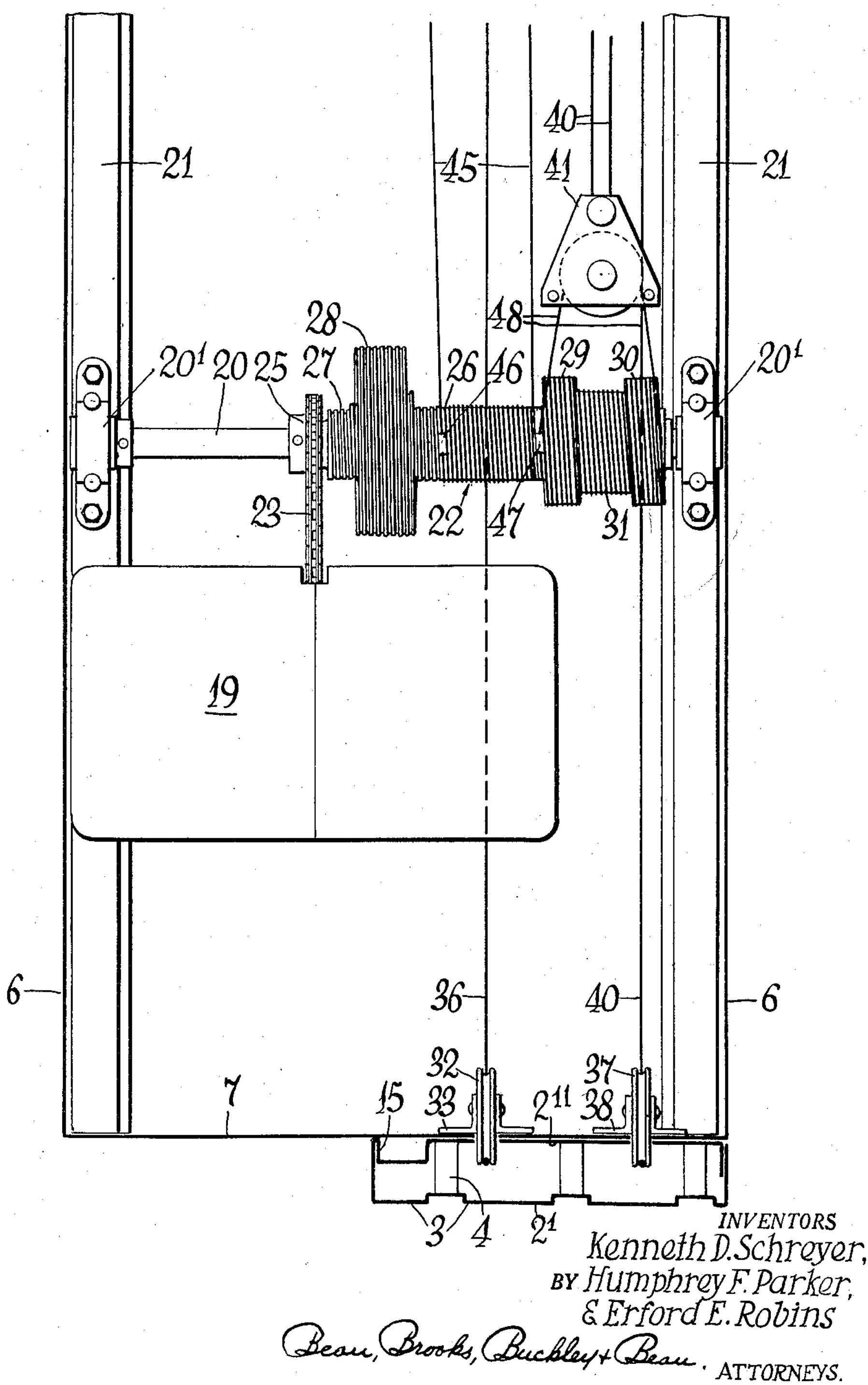

The device of this invention can be operated by a hoist mechanism of relatively low capacity powered, for example, by a single phase electric motor having approximately one-half horse-power output, the motor and a speed reducing gear mechanism being positioned within base 5 and generally designated 19 (Fig. 8). A shaft 20 is journalled in bearings 20' carried by members 21 extending along front and rear walls 6 between side walls 7 and mounts a differential drum generally designated 22 designed to be selectively rotated in opposite directions by the power unit 19 through an appropriate drive, such as, for example, a chain 23 engaging an output sprocket on the power unit 19 and a sprocket 25 on shaft 20. Drum 22 has grooved portions of different diameter comprising a center portion 26 of relatively small diameter, one end portion 27 of the same diameter and a portion 28 of relatively large diameter therebetween. Adjacent the opposite end of drum 22 there are provided two axially spaced portions 29 and 30 of equal diameter between that of portions 26 and 28, and between portions 29 and 30 there is a portion 31 of a diameter between that of portions 26 and 29. The purpose in providing such portions of different diameter is to produce variations in speed of travel of the racks, as will become apparent.

A pair of horizontally aligned sheaves 32, 32' are mounted on the frame by brackets 33 adjacent the lower ends of side walls 2, the sheave 32' being a double sheave, and a second pair of sheaves 34 in generally vertical alignment with sheaves 32, 32' but with their axes at right angles thereto are mounted on side walls 2 adjacent the upper ends thereof by brackets 35. Sheaves 32, 32' and 34 provide trackways over which a pair of cables 36 are trained, one end of each cable 36 being secured to a sheave block 36'. One cable 36 is trained around one sheave 32' and the sheave 34 thereabove, and the other cable 36 extends around one sheave 32' and then back to sheave 32 and up to the sheave 34 thereabove. The other ends of the cables 36 are secured to the vertically moving bottom rack 11' adjacent the opposite ends thereof.

A second pair of generally horizontally aligned sheaves 37, 37' are mounted on the opposite side walls 2 adjacent the lower ends thereof by brackets 38, the sheaves 37' being double sheave, and a pair of cables 40 each having one end connected to a second sheave block 41 are trained around the sheaves 37, 37' with one cable 40 training around the sheave 37' and thence upwardly, and the other cable 40 training around the sheave 37' and then the sheave 37 and thence upwardly. The other ends of cables 40 train around the semicricular cam devices 14 of rack 10 in grooves 42 therein, and are formed with a loop 40' engaged by a threaded link 43 adjustably secured to a lug 44 on the rear flat side of each cam device, as by lock nuts 43' bearing on opposite sides of said lugs. This adjustable connection facilitates proper tensioning of cables 40.

In this particular embodiment of the invention, when the position fo the top and bottom racks 10 and 11 is reversed the top rack 10 swings generally horizontally outwardly through the arc *a* (Fig. 2) at a relatively fast speed, then vertically downwardly through arc *b* at a slower speed, and then generally horizontally inwardly through arc *c* at a relatively fast speed to its lower position. The bottom rack 11 moves vertically upwardly at generally a constant and relatively fast speed, moving substantially only during the intermediate downward movement of top rack 10 through arc *b*. This pattern of operation is provided by the differential drum 22 in the following manner. A cable 45 is trained around sheave block 36' and has its opposite ends secured to portion 26 of drum 22 at a point axially spaced from portion 28 by a double anchor block 46, with one reach thereof normally extending directly to anchor block 46 and the other reach thereof normally initially engaging portion 26 adjacent portion 29 and being wrapped around portion 26 to anchor block 46. This is when the parts are in their normal position of rest illustrated in Figs. 7 and 8 with top rack 10 in its upper position and bottom rack 11 in its lower position. A cable 48 is trained through sheave block 41 and has its opposite ends secured to portion 26 of drum 22 adjacent portion 29 by double anchor block 47. In the normal position, one reach of cable 48 extends directly to anchor block 47 and the other reach thereof initially contacts drum 22 at the outer edge of portion 30 thereof, being wrapped along portions 30, 31 and 29 to anchor block 47.

When it is desired to lower rack 10 and raise rack 11, the operator need only actuate a motor control 54 conveniently located on one side wall 2, whereupon motor 19 rotates shaft 20 and drum 22 causing the wound reach of cable 48 to begin unwinding from the drum portion 30 at a rate greater than that at which the other reach of cable 48 is wound onto the drum portion 26, with the result that sheave block 41 is permitted to move away from drum 22 at a relatively fast rate permitting the rack 10 to swing outwardly at a relatively high speed through arc *a*. During this movement of rack 10, the wound reach of cable 45 is unwinding from portion 26 while the other reach thereof is winding thereon, whereby there is no movement of sheave block 36' toward drum 22 and consequently rack 11 remains stationary.

Then the normally wound reach of cable 48 begins to unwind from the drum portion 31 of lesser diameter while the other reach thereof continues to wind on portion 26, whereby rack 10 continues its downward movement through arc *b* but at a reduced speed. Approximately simultaneously therewith, the normally unwound reach of cable 45 begins winding onto the relatively large diameter drum portion 28 while the other reach thereof continues unwinding from the portion 26, whereby the sheave block 36' is pulled inwardly toward drum 22 causing cables 36 to pull the bottom rack 11 vertically upwardly along guide tracks 15. Because drum portion 28 has the largest diameter, rack 11 is pulled upwardly at a relatively fast speed, this occurring substantially during the time that rack 10 is moving downwardly at a relatively slow speed through arc *b*.

Then, about when bottom rack 11 reaches its upper position, the normally unwound reach of cable 45 begins winding onto portion 27 of the same diameter as portion 26 from which the other reach of cable 45 continues to unwind, whereby rack 11 remains stationary in its up position. Approximately simultaneously, the normally wound reach of cable 48 begins unwinding from drum portion 29 of larger diameter while the other reach thereof continues to wind on portion 26, thereby to accelerate the inward movement of rack 10 through arc *c* to its down position. At this point the parts are in the position schematically illustrated in Fig. 9.

Thus, the top rack 10 initially moves outwardly very quickly to get out of the way of the bottom rack, then the two racks move simultaneously in opposite directions with the bottom rack 11 moving faster than the top rack. The top rack then moves very quickly again into its down posiion. This provides for a high speed of operation while avoiding interferences between the racks. Also, the upper rack is caused to move relatively slowly through the aisle passage adjacent the unit, for better control to ensure against accidents.

Figures 2, 5, 6:
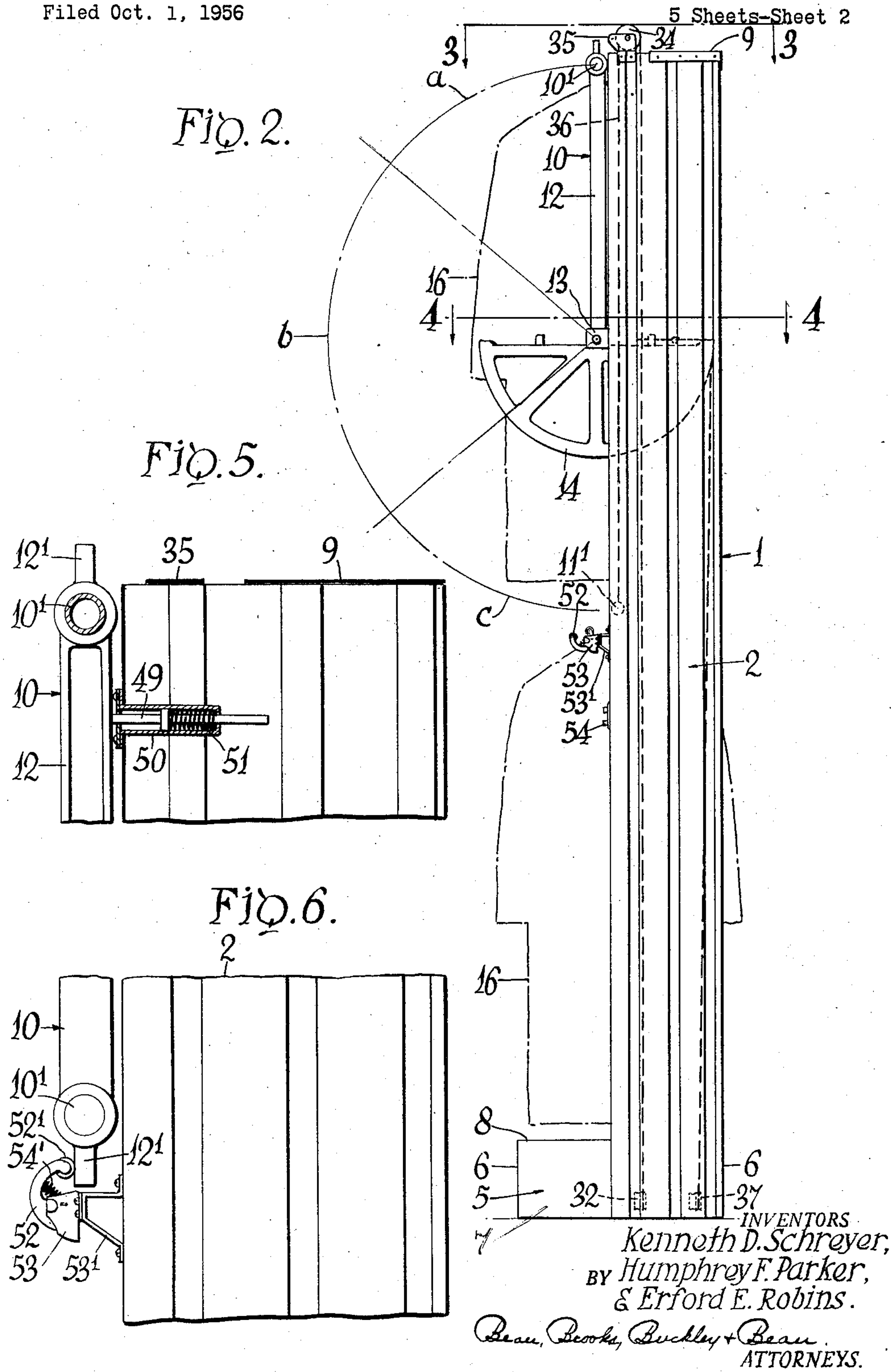
Fig. 2 is a side elevational view of one of said rack units.
Fig. 5 is a fragmentary view showing details of a spring-backed plunger member for initiating downward movement of the upper rack.
Fig. 6 is a fragmentary view showing details of a spring catch for holding the upper rack in down position.
Figure 3:
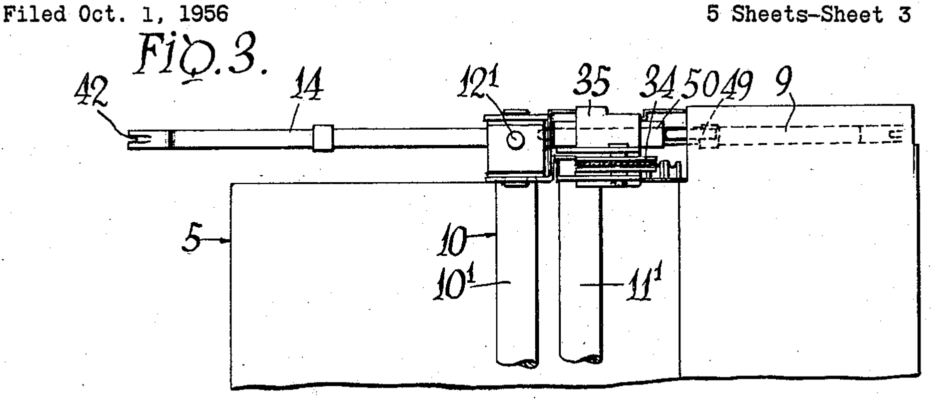
Fig. 3, is a fragmentary plan view taken about on line 3—3 of Fig. 2.
Figure 4:
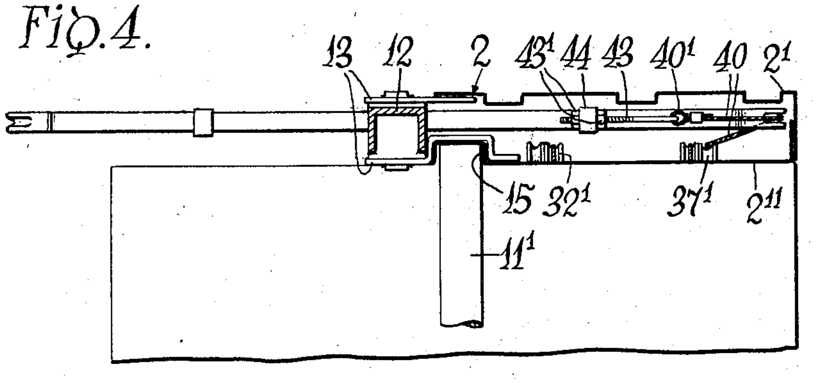
Fig. 4 is a transverse sectional view taken about on line 4—4 of Fig. 2.
Figure 7:
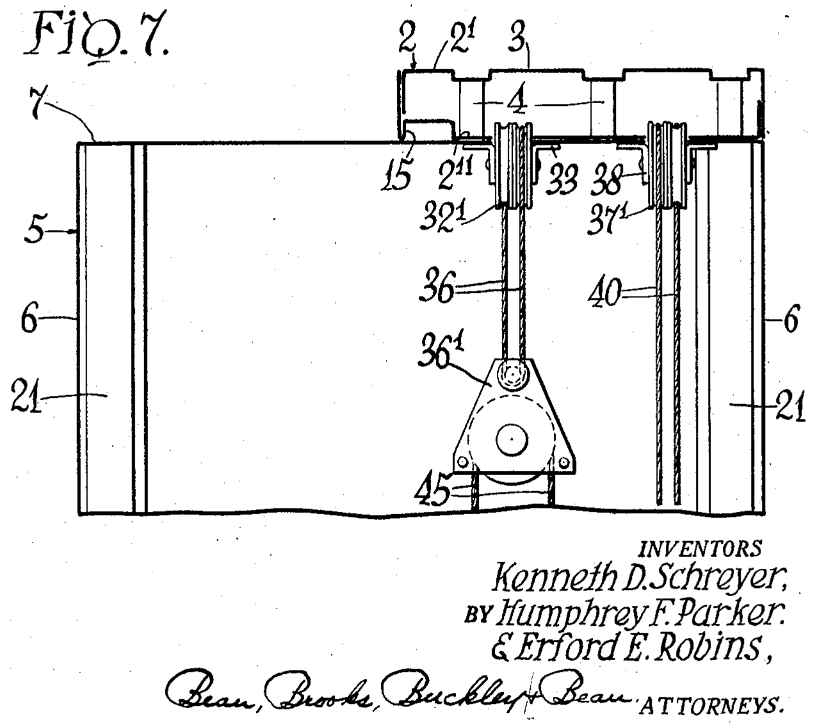
Figs. 7 and 8 are related views showing the actuating mechanism for interchanging the racks.

To insure initial downward movement of rack 10 along arc *a* as cable 48 begins to pay out, a starting mechanism is provided which can be a spring backed plunger as illustrated in Fig. 5. Such mechanism comprises a plunger member 49 slidable in a cup shaped member 50 secured to a side wall 2, the plunger 49 being urged outwardly by a spring 51 against one arm 12 of rack 10, thereby constantly urging rack 10 away from its normal position of rest. Power unit 19 has appropriate motor brake means precluding unauthorized rotation of drum 22.

Also, anchor means are provided for releasably holding top rack 10 in down position, which can take the form of the spring latch illustrated in Fig. 6. Such latch comprises a catch 52 pivoted on a base 53 mounted on a side wall 2 by a bracket 53' and urged about its pivot and into engagement with an extension 12' of the associated arm 12 by a coil spring 54'. Catch 52 carries a roller 52' which bears against arm extension 12', whereby rack 10 is effectively held in down position and cams the latch out of the way upon upward swinging movement.

Figures 10, 11, 12:
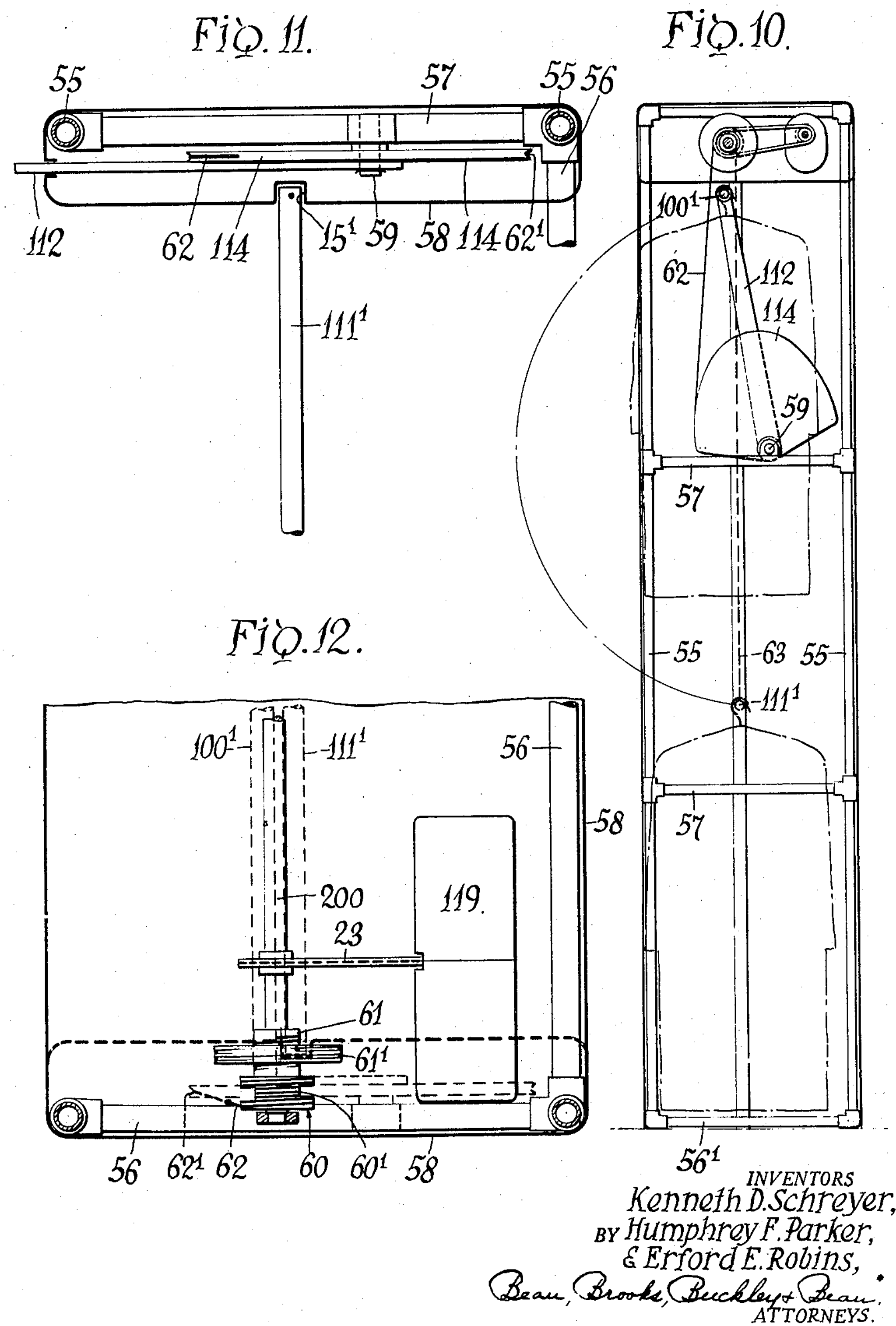
Fig. 10 is a side elevational view, with covering shroud removed, corresponding to Fig. 2, but illustrating a modified embodiment of the invention.
Fig. 11 is a fragmentary detail view of the upper rack thereof.
Fig. 12 is a fragmentary detail view of the actuating mechanism thereof.

In the embodiment of the invention shown in Figs. 10 through 12, the frame is again generally vertically disposed and of rectangular form, but comprises vertical tubular members 55 disposed at each corner and tubular cross members 56 and 56' interconnecting the ends thereof. Spaced horizontal tubular members 57 interconnect the side members 55 at spaced points between the opposite ends thereof to reinforce the frame and shrouds 58 of light metal or other suitable material can be provided at the top and on opposite sides of the frame to improve the appearance thereof. Here again, there is provided a lower rack having a horizontal bar 111′ movable in vertical guide tracks 15′ formed in shrouds 58, and an upper rack having a horizontal bar 100′ carried on the outer ends of arms 112 which in this instance are provided with differently shaped cam devices 114 pivoted on the upper pair of cross braces 57 as indicated at 59.

A motor and reduction gear unit 119 is provided, this time being mounted on the upper end of the frame within the upper shroud 58, and rotates a shaft 200 as by the chain drive 23. However, instead of the one differential drum 22, shaft 200 carries at each end thereof a drum 60 having a center portion 60′ of reduced diameter and a drum 61 having a center portion 61′ of enlarged diameter larger than the outside diameter of drum 60. Cables 62 are connected at one end to the cam devices 114, engaging in grooves 62′ therein and at their other ends to the drums 60 for winding and unwinding thereon. Other cables 63 are connected at one end to the drums 61 for winding and unwinding thereon and at their other ends to the lower rack bar 111. Cables 62 normally are wound along drums 60, and cables 63 normally are unwound from drums 61.

Thus, upon actuating their control device corresponding to 54 the power unit 119 will rotate shaft 200 causing cables 62 to unwind from drums 60, first along a larger diameter portion at a relatively fast rate, then along the smaller diameter portion 60′ at a slower rate, and then again at a fast rate, whereby the upper rack 100 will swing downwardly in the manner previously described. Simultaneously, the lower rack 111 is pulled upwardly by the cables 63 winding first along the relatively small diameter portions of drums 61 and then along the relatively large diameter medial portions 61′ thereof to impart a relatively fast upward movement thereto, followed by a relatively slow final movement.

While means such as the spring-backed plunger can be used to initiate downward movement of the top rack, this also can be accomplished by holding the rack off dead center when in its normal up position, as illustrated in Fig. 10, whereby downward movement is initiated by gravity. Thus, in this embodiment the top and bottom racks move simultaneously, but with the rate of movement thereof being exactly reversed so that the top rack swings outwardly relatively quickly, then relatively slowly downwardly and then relatively quickly inwardly, while the bottom rack moves upwardly first relatively slowly, then relatively quickly, and then relatively slowly, the variations in speed preferably occurring substantially simultaneously. Also, variations in speed are provided by the shape of cam devices 114, which can be varied.

Accordingly, it is seen that this invention fully accomplishes the foregoing objects, and provides a highly practical, advantageous and unique merchandise storage and display system. While only two embodiments of the invention are disclosed in detail herein, it is obvious that the invention is not necessarily limited to such details but that various modifications therein and variations thereof can be mades by those skilled in the art without departing from the spirit of the invention.

Having fully disclosed and completely described our invention, together with its mode of operation, what we claim as new is:

1. A merchandise storage and display unit comprising, a pair of vertically stacked racks adapted to store and/or display merchandise, means mounting one of said racks for swinging movement about a substantially horizontal axis between upper and lower positions, means mounting the other of said racks for substantially vertical reciprocating movement between upper and lower positions substantially aligned with the corresponding positions of said one rack, said one rack occupying its upper position when said other rack is in its lower position and vice versa, and drive means for so moving said racks to change the relative positions thereof.

2. A merchandise storage and display unit comprising, a first rack adapted to store and/or display merchandise and arranged for up and down movement between upper and lower positions thereof, a second rack also adapted to store and/or display merchandise, said second rack being arranged to swerve laterally and vertically about the path of the first rack between upper and lower positions corresponding generally to the upper and lower positions of said first rack, said first rack being in its upper position when said second rack is in its lower position and vice versa, and drive means for so moving said first and second racks to selectively interchange the relative positions thereof.

3. A merchandise storage and display unit as set forth in claim 2 wherein said drive means includes means for delaying movement of said first rack until said second rack has completed a predetermined portion of its lateral travel and for completing movement of said first rack to a predetermined position before completion of movement of said second rack.

4. A merchandise storage and display unit as set forth in claim 2, wherein said drive means includes means causing said second rack to swerve initially at a relatively fast speed, then at a relatively slow speed and finally again at a relatively fast speed.

5. A merchandise storage and display unit as set forth in claim 4, wherein said drive means includes means causing said first rack to move during substantially the entire swerving movement of said second rack.

6. A merchandise storage and display unit as set forth in claim 4, wherein said drive means includes means causing said first rack to move substantially only during the relatively slow swerving movement of said second rack.

7. A merchandise storage and display unit comprising, a pair of vertically stacked racks adapted to store and display merchandise, means mounting one of said racks for swerving movement between upper and lower positions, means mounting the other of said racks for substantially vertical reciprocating movement between upper and lower positions substantially aligned with the corresponding positions of said one rack, said one rack occupying its upper position when said other rack is in its lower position and vice versa, and drive means for so moving said racks to change the relative position thereof.

8. A merchandise storage and display unit comprising, a first rack adapted to store and/or display merchandise and arranged for up and down movement between upper and lower positions thereof, a second rack also adapted to store and/or display merchandise, said second rack being arranged first to swerve substantially laterally, then to swerve substantially vertically and finally to swerve substantially laterally between upper and lower positions of said first rack, said first rack being in its upper position when said second rack is in its lower position and vice versa, and drive means for so moving said first and second racks to selectively interchange the relative positions thereof.

9. A merchandise storage display unit as set forth in claim 8 wherein said drive means includes means for delaying movement of said first rack until said second rack has completed a predetermined portion of its lateral travel and for completing movement of said first rack to a predetermined position before completion of movement of said second rack.

10. A merchandise storage and display unit as set forth in claim 8, wherein said drive means includes means causing said second rack to swerve initially at a relatively fast speed, then at a relatively slow speed and finally again at a relatively fast speed.

11. A merchandise storage an display unit as set forth in claim 10, wherein said drive means includes means causing said first rack to move during substantially the entire swerving movement of said second rack.

12. A merchandise storage and display unit as set forth in claim 10, wherein said drive means includes means causing said first rack to move substantially only during the relatively slow swerving movement of said second rack.

References Cited in the file of this patent

UNITED STATES PATENTS

| | | |
|---|---|---|
| 2,155,583 | Bonnar | Apr. 25, 1939 |
| 2,659,647 | Lyon | Nov. 17, 1953 |